US008231464B2

(12) United States Patent
Gelber et al.

(10) Patent No.: US 8,231,464 B2
(45) Date of Patent: Jul. 31, 2012

(54) MULTIGAME GAMING MACHINE WITH TRANSMISSIVE DISPLAY

(75) Inventors: Philip B. Gelber, Glen Ellyn, IL (US); Shridhar P. Joshi, Naperville, IL (US); Larry J. Pacey, Northbrook, IL (US); James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 645 days.

(21) Appl. No.: 12/086,953

(22) PCT Filed: Dec. 13, 2006

(86) PCT No.: PCT/US2006/047478

§ 371 (c)(1), (2), (4) Date: Jun. 19, 2008

(87) PCT Pub. No.: WO2007/078752

PCT Pub. Date: Jul. 12, 2007

(65) Prior Publication Data

US 2009/0117977 A1 May 7, 2009

Related U.S. Application Data

(60) Provisional application No. 60/751,671, filed on Dec. 19, 2005.

(51) Int. Cl.
*A63F 13/00* (2006.01)

(52) U.S. Cl. ................ 463/31; 463/16; 463/17; 463/18; 463/19; 463/20; 463/25; 463/34; 463/43

(58) Field of Classification Search .............. 463/16–20, 463/30–31, 25, 34, 43

See application file for complete search history.

(56) References Cited

U.S. PATENT DOCUMENTS 4,306,768 A 12/1981 Egging ......................... 350/174
4,371,870 A 2/1983 Biferno ......................... 340/716

(Continued)

FOREIGN PATENT DOCUMENTS

AU 1999-043488 3/2000

(Continued)

OTHER PUBLICATIONS

Defendant Bally Gaming Inc.'s Answer, Affirmative Defenses, and Counterclaims to Complaint for Patent Infringement; dated Nov. 9, 2010; Civil Action No. 1:10-CV06679; pp. 1-29.

(Continued)

*Primary Examiner* — Sunit Pandya

(74) *Attorney, Agent, or Firm* — Nixon Peabody LLP

(57) ABSTRACT

Gaming machine is disclosed having a primary display and a secondary display mounted over the primary display. In one implementation, the primary display is a mechanical display and the secondary display is a transmissive display. This arrangement allows a wagering game to be displayed on the mechanical display alone, the mechanical display and the transmissive display together, or the transmissive display alone. As a result, players and casino operators have access to multiple wagering games on the same display area of the gaming machine. All three options need not be present on the gaming machine, however, and any two of the three will suffice. It is important, however, that the wagering game displayed on the transmissive display be separate and distinct from the wagering game displayed on the mechanical display.

25 Claims, 7 Drawing Sheets

U.S. PATENT DOCUMENTS

| | | | | |
|---|---|---|---|---|
| 4,454,670 | A | 6/1984 | Bachmann et al. | 194/350 |
| 4,517,558 | A | 5/1985 | Davids | 340/700 |
| 4,518,225 | A | 5/1985 | Fredrickson et al. | 350/338 |
| 4,562,433 | A | 12/1985 | Biferno | 340/716 |
| 4,568,928 | A | 2/1986 | Biferno | 340/716 |
| 4,718,672 | A | 1/1988 | Okada | 273/143 R |
| 4,756,414 | A | 7/1988 | Mott | 206/328 |
| 4,826,296 | A | 5/1989 | Yoshimura | 350/338 |
| 4,976,429 | A | 12/1990 | Nagel | 273/1 |
| 4,998,804 | A | 3/1991 | Horiuchi | 350/334 |
| 5,146,354 | A | 9/1992 | Plesinger | 359/49 |
| 5,152,529 | A | 10/1992 | Okada | 273/143 |
| 5,258,844 | A | 11/1993 | Nakayama et al. | 358/209 |
| 5,283,560 | A | 2/1994 | Bartlett | 345/113 |
| 5,351,966 | A | 10/1994 | Tohyama et al. | 273/311 |
| 5,372,745 | A | 12/1994 | Yoshinaga | 252/299 |
| 5,375,043 | A | 12/1994 | Tokunaga | 362/31 |
| 5,393,061 | A | 2/1995 | Manship et al. | 273/143 R |
| 5,546,296 | A | 8/1996 | Savignac et al. | 363/60 |
| 5,580,055 | A | 12/1996 | Hagiwara | 273/143 R |
| 5,636,101 | A | 6/1997 | Bonsall et al. | 361/681 |
| 5,667,439 | A | 9/1997 | Okada | 463/20 |
| 5,673,128 | A | 9/1997 | Ohta et al. | 349/62 |
| 5,691,788 | A | 11/1997 | Kim | 349/96 |
| 5,695,188 | A | 12/1997 | Ishibashi | 273/143 R |
| 5,697,843 | A | 12/1997 | Manship et al. | 463/20 |
| 5,722,891 | A | 3/1998 | Inoue | 463/20 |
| 5,725,210 | A | 3/1998 | Yamaguchi et al. | 273/121 |
| 5,725,428 | A | 3/1998 | Achmuller | 463/20 |
| 5,745,199 | A | 4/1998 | Suzuki et al. | 349/95 |
| 5,752,881 | A | 5/1998 | Inoue | 273/143 R |
| 5,768,095 | A | 6/1998 | Nakamura et al. | 361/681 |
| 5,810,665 | A | 9/1998 | Takemoto et al. | 463/31 |
| 5,836,819 | A | 11/1998 | Ugawa | 463/30 |
| 5,890,962 | A | 4/1999 | Takemoto | 463/20 |
| 5,920,256 | A | 7/1999 | Toffolo | 340/461 |
| 5,934,672 | A | 8/1999 | Sines et al. | 273/143 R |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,086,066 | A | 7/2000 | Takeuchi et al. | 273/143 R |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |
| 6,135,885 | A | 10/2000 | Lermusiaux | 463/20 |
| 6,141,067 | A | 10/2000 | Ikka | 349/65 |
| 6,151,169 | A | 11/2000 | Kim | 359/640 |
| 6,159,097 | A | 12/2000 | Gura | 463/20 |
| 6,159,098 | A * | 12/2000 | Slomiany et al. | 463/25 |
| 6,164,645 | A | 12/2000 | Weiss | 273/138.2 |
| 6,181,301 | B1 | 1/2001 | Inoguchi et al. | 345/5 |
| 6,190,255 | B1 | 2/2001 | Thomas et al. | 463/20 |
| 6,193,606 | B1 | 2/2001 | Walker et al. | 463/20 |
| 6,219,228 | B1 | 4/2001 | Sun | 361/683 |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,315,663 | B1 | 11/2001 | Sakamoto | 463/20 |
| 6,317,128 | B1 | 11/2001 | Harrison et al. | 345/629 |
| 6,339,418 | B1 | 1/2002 | Kitagawa | 345/102 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffinan et al. | 463/26 |
| 6,377,339 | B1 | 4/2002 | Westerman | 355/75 |
| 6,406,159 | B1 | 6/2002 | Yamamoto | 362/31 |
| 6,419,579 | B1 | 7/2002 | Bennett | 463/20 |
| 6,471,208 | B2 | 10/2002 | Yoseloff et al. | |
| 6,475,087 | B1 | 11/2002 | Cole | 463/20 |
| 6,517,432 | B1 | 2/2003 | Jaffe | 463/16 |
| 6,517,433 | B2 | 2/2003 | Loose et al. | 463/20 |
| 6,600,527 | B1 | 7/2003 | Basturk et al. | 349/74 |
| 6,623,006 | B2 | 9/2003 | Weiss | 273/138 |
| 6,638,165 | B2 | 10/2003 | Uchiyama et al. | 463/20 |
| 6,642,975 | B2 | 11/2003 | Chino et al. | 349/65 |
| 6,695,696 | B1 | 2/2004 | Kaminkow | 463/16 |
| 6,705,611 | B2 | 3/2004 | Kato | 273/143 R |
| 6,720,021 | B2 | 4/2004 | Wong et al. | 426/633 |
| 6,720,961 | B2 | 4/2004 | Tracy | 345/419 |
| 6,734,927 | B2 | 5/2004 | Sato | 349/58 |
| 6,790,140 | B1 | 9/2004 | Niwa | 463/20 |
| 6,802,575 | B1 | 10/2004 | Lee | 312/72 |
| 6,811,273 | B2 | 11/2004 | Satoh et al. | 362/27 |
| 6,817,946 | B2 | 11/2004 | Motegi et al. | 463/31 |
| 6,820,875 | B1 | 11/2004 | Hedrick et al. | 273/138.1 |
| 6,824,466 | B1 | 11/2004 | Hirota | 463/20 |
| 6,837,790 | B1 | 1/2005 | Kaminkow | 463/31 |
| 6,853,410 | B2 | 2/2005 | Matsuda et al. | 349/67 |
| 6,887,157 | B2 | 5/2005 | Lemay et al. | |
| 6,893,345 | B2 | 5/2005 | Motegi et al. | 463/31 |
| 6,923,721 | B2 | 8/2005 | Luciano et al. | 463/24 |
| 6,937,298 | B2 | 8/2005 | Okada | 349/58 |
| 6,942,571 | B1 | 9/2005 | McAllister et al. | 463/20 |
| 6,954,238 | B2 | 10/2005 | Liu et al. | 349/65 |
| 6,976,915 | B2 | 12/2005 | Baker et al. | 463/1 |
| 7,092,048 | B2 | 8/2006 | Jeong | 349/58 |
| 7,097,560 | B2 | 8/2006 | Okada | 463/20 |
| 7,115,033 | B1 | 10/2006 | Timperley | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,169,048 | B2 | 1/2007 | Nozaki et al. | 463/30 |
| 7,204,753 | B2 | 4/2007 | Ozaki et al. | 463/16 |
| 7,207,883 | B2 | 4/2007 | Nozaki et al. | 463/24 |
| 7,219,893 | B2 | 5/2007 | Tanimura et al. | 273/143 |
| 7,220,181 | B2 | 5/2007 | Okada | 463/32 |
| 7,234,697 | B2 | 6/2007 | Okada | 273/143 |
| 7,255,643 | B2 | 8/2007 | Ozaki et al. | 463/20 |
| 7,281,980 | B2 | 10/2007 | Okada | 463/20 |
| 7,322,884 | B2 | 1/2008 | Emori et al. | 463/16 |
| 7,329,181 | B2 | 2/2008 | Hoshino et al. | 463/20 |
| 7,355,660 | B2 | 4/2008 | Ikeda | 349/60 |
| 7,390,259 | B2 | 6/2008 | Okada | 463/20 |
| 7,404,766 | B2 | 7/2008 | Adachi et al. | 463/31 |
| 7,458,890 | B2 | 12/2008 | Loose et al. | 463/16 |
| 7,465,228 | B2 | 12/2008 | Okada | 463/20 |
| 7,479,061 | B2 | 1/2009 | Okada | 463/20 |
| 7,479,066 | B2 | 1/2009 | Emori | 463/46 |
| 7,485,039 | B2 | 2/2009 | Okada | 463/20 |
| 7,510,475 | B2 | 3/2009 | Loose et al. | 463/31 |
| 7,510,476 | B2 | 3/2009 | Kobayashi | 463/31 |
| 7,520,812 | B2 | 4/2009 | Okada | 463/31 |
| 7,585,220 | B2 | 9/2009 | Loose et al. | 463/20 |
| 7,682,244 | B1 | 3/2010 | Luciano, Jr. et al. | 463/25 |
| 7,695,364 | B2 | 4/2010 | Okada | 463/20 |
| 7,730,413 | B1 | 6/2010 | Engel et al. | 715/764 |
| 2001/0000636 | A1 | 5/2001 | Weiss | 273/138.2 |
| 2001/0013681 | A1 | 8/2001 | Bruzzese et al. | 273/143 |
| 2001/0019479 | A1 | 9/2001 | Nakabayashi et al. | 362/31 |
| 2001/0031658 | A1 | 10/2001 | Ozaki et al. | 463/16 |
| 2001/0036864 | A1 | 11/2001 | Melas | |
| 2001/0050736 | A1 | 12/2001 | Lee et al. | 349/65 |
| 2001/0052955 | A1 | 12/2001 | Nagatani | 349/65 |
| 2002/0063816 | A1 | 5/2002 | Nakamura et al. | 349/65 |
| 2002/0142830 | A1 | 10/2002 | Adams | 463/20 |
| 2002/0175466 | A1 | 11/2002 | Loose et al. | 273/143 |
| 2003/0016313 | A1 | 1/2003 | Jeong | 349/58 |
| 2003/0060269 | A1 | 3/2003 | Paulsen et al. | 463/20 |
| 2003/0087689 | A1 | 5/2003 | Adams | 463/20 |
| 2003/0087690 | A1 | 5/2003 | Loose et al. | 463/20 |
| 2003/0130028 | A1 | 7/2003 | Aida et al. | 463/20 |
| 2003/0157980 | A1 | 8/2003 | Loose et al. | 463/20 |
| 2003/0162579 | A1 | 8/2003 | Gauselmann | 463/16 |
| 2003/0166417 | A1 | 9/2003 | Moriyama et al. | 463/46 |
| 2003/0184690 | A1 | 10/2003 | Ogiwara et al. | 349/61 |
| 2003/0214471 | A1 | 11/2003 | Topelberg | 345/87 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0021705 | A1 | 2/2004 | Baker et al. | 347/2 |
| 2004/0029636 | A1 | 2/2004 | Wells | 463/32 |
| 2004/0048646 | A1 | 3/2004 | Visocnik | 463/16 |
| 2004/0052078 | A1 | 3/2004 | Hosaka | 362/302 |

| | | | | |
|---|---|---|---|---|
| 2004/0062025 | A1 | 4/2004 | Satoh et al. | 362/27 |
| 2004/0063490 | A1 | 4/2004 | Okada | 463/20 |
| 2004/0116178 | A1 | 6/2004 | Okada | 463/20 |
| 2004/0147303 | A1 | 7/2004 | Imura et al. | 463/16 |
| 2004/0150162 | A1 | 8/2004 | Okada | 273/292 |
| 2004/0152501 | A1 | 8/2004 | Okada | 463/16 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0192441 | A1 | 9/2004 | Nonaka | 463/31 |
| 2004/0198485 | A1* | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209676 | A1 | 10/2004 | Onishi et al. | 463/29 |
| 2004/0209678 | A1 | 10/2004 | Okada | 463/30 |
| 2004/0209679 | A1 | 10/2004 | Nonaka | 463/30 |
| 2004/0209681 | A1 | 10/2004 | Emori et al. | 463/31 |
| 2004/0209682 | A1 | 10/2004 | Okada | 463/31 |
| 2004/0209683 | A1 | 10/2004 | Okada | 463/31 |
| 2004/0214635 | A1 | 10/2004 | Okada | 463/30 |
| 2004/0214636 | A1 | 10/2004 | Nonaka | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0242323 | A1 | 12/2004 | Okada | 463/31 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0020349 | A1 | 1/2005 | Tachikawa | 463/20 |
| 2005/0032571 | A1 | 2/2005 | Asonuma | 463/20 |
| 2005/0049030 | A1 | 3/2005 | Tachikawa | 463/20 |
| 2005/0049032 | A1 | 3/2005 | Kobayashi | 463/20 |
| 2005/0054433 | A1 | 3/2005 | Iwamoto | 463/25 |
| 2005/0140088 | A1 | 6/2005 | Randall | 273/143 |
| 2005/0153775 | A1* | 7/2005 | Griswold et al. | 463/30 |
| 2005/0170879 | A1 | 8/2005 | Tachikawa | 463/16 |
| 2005/0187003 | A1 | 8/2005 | Adachi et al. | 463/16 |
| 2005/0187006 | A1 | 8/2005 | Tachikawa | 463/20 |
| 2005/0187007 | A1 | 8/2005 | Kuroiwa | 463/20 |
| 2005/0187009 | A1 | 8/2005 | Osawa | 463/20 |
| 2005/0192083 | A1 | 9/2005 | Iwamoto | 463/20 |
| 2005/0192084 | A1 | 9/2005 | Iwamoto | 463/20 |
| 2005/0192085 | A1 | 9/2005 | Iwamoto | 463/20 |
| 2005/0192090 | A1 | 9/2005 | Muir et al. | 463/30 |
| 2005/0192099 | A1* | 9/2005 | Nguyen et al. | 463/42 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0089192 | A1 | 4/2006 | Okada | 463/20 |
| 2006/0128467 | A1 | 6/2006 | Thomas | 463/31 |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0060296 | A1 | 3/2007 | Yoshizawa | 463/20 |
| 2007/0123348 | A1 | 5/2007 | Nozaki | 463/30 |
| 2007/0149281 | A1 | 6/2007 | Gadda et al. | 463/34 |
| 2007/0184893 | A1 | 8/2007 | Fujimoto | 463/20 |
| 2008/0020820 | A1 | 1/2008 | Iwamoto | 463/20 |
| 2008/0125210 | A1 | 5/2008 | Iwamoto | 463/20 |
| 2008/0176653 | A1 | 7/2008 | Kishi | 463/31 |
| 2008/0261674 | A9 | 10/2008 | Okada | 463/16 |
| 2008/0311977 | A1 | 12/2008 | Okada | 463/20 |
| 2009/0131148 | A1 | 5/2009 | Loose et al. | 463/20 |
| 2009/0181758 | A1 | 7/2009 | Loose et al. | 463/20 |
| 2009/0247276 | A1 | 10/2009 | Okada | 463/20 |

FOREIGN PATENT DOCUMENTS

| | | | |
|---|---|---|---|
| AU | 2000-030185 | | 11/2000 |
| CA | 2282782 | | 3/2000 |
| EP | 0 060 019 | A1 | 9/1982 |
| EP | 0 789 338 | A1 | 8/1997 |
| EP | 1260928 | | 11/2002 |
| EP | 1376494 | | 1/2004 |
| EP | 1376495 | | 1/2004 |
| EP | 1424663 | | 6/2004 |
| GB | 2 124 505 | A | 2/1984 |
| GB | 2 165 074 | A | 4/1986 |
| GB | 2242052 | A | 9/1991 |
| GB | 2 235 299 | A | 9/1992 |
| GB | 2253299 | A | 9/1992 |
| GB | 2 349 494 | A | 11/2000 |
| JP | 60-061079 | | 4/1985 |
| JP | 61-279272 | | 12/1986 |
| JP | 2019182 | | 1/1990 |
| JP | 04-109977 | | 4/1992 |
| JP | 04-114676 | | 4/1992 |
| JP | 1992-220275 | | 8/1992 |
| JP | 04-341288 | | 11/1992 |
| JP | 05-177043 | | 7/1993 |
| JP | 06-039085 | | 2/1994 |
| JP | 1994-142279 | | 5/1994 |
| JP | 07-16340 | | 1/1995 |
| JP | 07-124290 | | 5/1995 |
| JP | 4072 99189 | A | 11/1995 |
| JP | 08-010381 | | 1/1996 |
| JP | 08-080364 | | 3/1996 |
| JP | 08-103541 | | 4/1996 |
| JP | 2531253 | | 1/1997 |
| JP | 9-207625 | | 8/1997 |
| JP | 10-071228 | | 3/1998 |
| JP | 10-091076 | | 4/1998 |
| JP | 10-305130 | | 11/1998 |
| JP | 10-328398 | | 11/1998 |
| JP | 11-090017 | | 4/1999 |
| JP | 11-099240 | | 4/1999 |
| JP | 11-137774 | | 5/1999 |
| JP | 11-152970 | | 6/1999 |
| JP | 11-153970 | | 6/1999 |
| JP | 11-206960 | | 8/1999 |
| JP | 11-244451 | | 9/1999 |
| JP | 11-253610 | | 9/1999 |
| JP | 2000-011725 | | 1/2000 |
| JP | 2000-51314 | | 2/2000 |
| JP | 2000-65097 | | 3/2000 |
| JP | 2000-68925 | | 3/2000 |
| JP | 2000-189554 | | 7/2000 |
| JP | 2000-262738 | | 9/2000 |
| JP | 2000-300729 | | 10/2000 |
| JP | 2000-300731 | | 10/2000 |
| JP | 2001-350805 | | 12/2000 |
| JP | 2001-025546 | | 1/2001 |
| JP | 2001-058046 | | 3/2001 |
| JP | 2001-062032 | | 3/2001 |
| JP | 2001-137461 | | 5/2001 |
| JP | 2000-238995 | | 9/2001 |
| JP | 2001-252393 | | 9/2001 |
| JP | 2001-252394 | | 9/2001 |
| JP | 2002-113150 | | 4/2002 |
| JP | 2003-236037 | | 8/2003 |
| JP | 2003-260184 | | 9/2003 |
| JP | 2004-008705 | | 1/2004 |
| RU | 2000128696 | | 10/2002 |
| RU | 2001103774 | | 1/2003 |
| WO | WO 98/03962 | | 1/1998 |
| WO | WO 99/53454 | A1 | 10/1999 |
| WO | WO 99/64997 A 1 | | 12/1999 |
| WO | WO 00/32286 | A1 | 6/2000 |
| WO | WO 01/28647 | | 4/2001 |
| WO | WO 01/72387 | | 10/2001 |
| WO | WO 03/039699 | | 5/2003 |

| | | | |
|---|---|---|---|
| WO | WO 2006/036948 | A2 | 4/2006 |
| WO | WO 2006/124976 | A1 | 11/2006 |
| WO | WO2007/011717 | A2 | 1/2007 |

OTHER PUBLICATIONS

Complaint for Patent Infringement; dated Oct. 16, 2010; pp. 1-64.
"Bigfoot" Product Sheet, Shuffle Master, Inc., 1 page (2000).
"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Gooooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).
"Neptune's Pearls" Product Sheet, Unidesa Gaming, 4 pages (1998).
"Penguin Pays" Product Sheet, Aristocrat Incorporated, 2 pages (1998).
"Stroke of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).
International Search Report, PCT Application No. PCT/US2006/047478, 1 page, dated Nov. 21, 2007.
Written Opinion, PCT Application No. PCT/US2006/047478, 5 pages, dated Nov. 21, 2007.

* cited by examiner

MULTIGAME GAMING MACHINE WITH TRANSMISSIVE DISPLAY

CROSS REFERENCE TO RELATED APPLICATIONS

This application is a U.S. national phase of International Application No. PCT/US2006/047478, filed Dec. 13, 2006, which claims the benefit of priority of U.S. Provisional Patent Application No. 60/751,671, filed Dec. 19, 2005, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine capable of displaying multiple wagering games on a single display area.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus wagering game may comprise any type of game, either similar to or completely different from the basic wagering game, which is entered upon the occurrence of a selected event or outcome in the basic wagering game. Generally, bonus wagering games provide a greater expectation of winning than the basic wagering game and may also be accompanied by more attractive or unusual video displays and/or audio. Bonus wagering games may additionally award players with "progressive jackpot" awards that are funded, at least in part, by a percentage of coin-in from the gaming-machine or a plurality of participating gaming machines.

Another way to increase the entertainment value of a game is to enhance the display of the gaming machines. For gaming machines with video displays, improvements in video technology have enabled the display of richer and more colorful graphics. For mechanical displays, however, the improvements early on were less technologically evolved. For example, some mechanical reel symbols were colored by simply backlighting the symbols with colored lighting elements. Sometimes the reel itself might contain electroluminescent elements that defined one or more reel symbols. To display a reel symbol in multiple colors or formats using such technology, multiple electroluminescent elements were needed for each reel symbol.

Recent advances in display technology, however, have made it possible to more easily modify the appearance of a mechanical display. For example, transmissive displays allow various video images to be superimposed on the mechanical display. A transmissive display, in essence, is a transparent video display that is mounted over the mechanical display. The transmissive display is operated to selectively present video images on top of the mechanical display. The video images may include translucent portions so that the underlying mechanical display is visible, but in a modified state (i.e., different color, texture, etc.). The video images may also include opaque portions so as to completely block out the underlying mechanical display. For information regarding the use of transmissive display technology in gaming machines, the reader is referred to commonly assigned U.S. Published Application No. 20040198485, entitled "Gaming Machine with Superimposed Display Image," filed on Nov. 7, 2003 and incorporated herein by reference in its entirety.

The above-described transmissive display technology gives wagering game designers the capability and flexibility to more easily design and modify the appearance of mechanical displays. However, in existing gaming machines, the transmissive display is employed primarily to enhance or supplement the wagering games that are displayed on the mechanical display. The transmissive display has not heretofore been used to display its own wagering game separate and distinct from the wagering game on the mechanical display. As a result, most existing gaming machines are limited to only the wagering game displayed on the mechanical display.

Accordingly, there is a need to develop new and improved gaming machines that take full advantage of the capabilities of transmissive display technology to enhance the entertainment value of the gaming machines.

SUMMARY OF THE INVENTION

The present invention is directed to a gaming machine having a primary display and a secondary display mounted over the primary display. In one implementation, the primary display is a mechanical display and the secondary display is a transmissive display. This arrangement allows a wagering game to be displayed on the mechanical display alone, the mechanical display and the transmissive display together, or the transmissive display alone. As a result, players and casino operators have access to multiple wagering games on the same display area of the gaming machine. All three options need not be present on the gaming machine, however, and any two of the three will suffice. It is important, however, that the wagering game displayed on the transmissive display be separate and distinct from the wagering game displayed on the mechanical display.

According to one aspect of the invention, a gaming machine comprises a wager input device configured to accept a wager input from a player at the gaming machine and a primary display selectively operable to display a first randomly selected outcome of a first wagering game in response to a first wager. A transmissive display overlays the primary display and is selectively operable to display a second randomly selected outcome of a second wagering game in response to a second wager. The transmissive display is configured to display the second randomly selected outcome of the second wagering game independently of the primary display.

According to another aspect of the invention, a method of operating a gaming machine comprises receiving a wager input from a player at the gaming machine, where the gaming machine includes a transmissive display mounted over a mechanical display. The gaming machine has at least two display options selected from the following: (a) the mechanical display without the transmissive display, (b) the mechanical display together with the transmissive display, and (c) the transmissive display without the mechanical display. The method further comprises selecting one of the at least two display options to use on the gaming machine and displaying a first wagering game if option (a) is selected, a second wagering game if option (b) is selected, and a third wagering game if option (c) is selected. The third wagering game is separate and distinct from the first wagering game and the second wagering game.

According to still another aspect of the invention, a method of operating a gaming machine comprises providing a first wagering game on a first display of the gaming machine, then replacing the first wagering game on the first display with a second wagering game on a second display of the gaming machine. The first and second displays occupy the same display area on the gaming machine and the first and second wagering games are separate and distinct from one another.

According to yet another aspect of the invention, a computer readable storage medium is encoded with instructions for directing a gaming machine to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1:
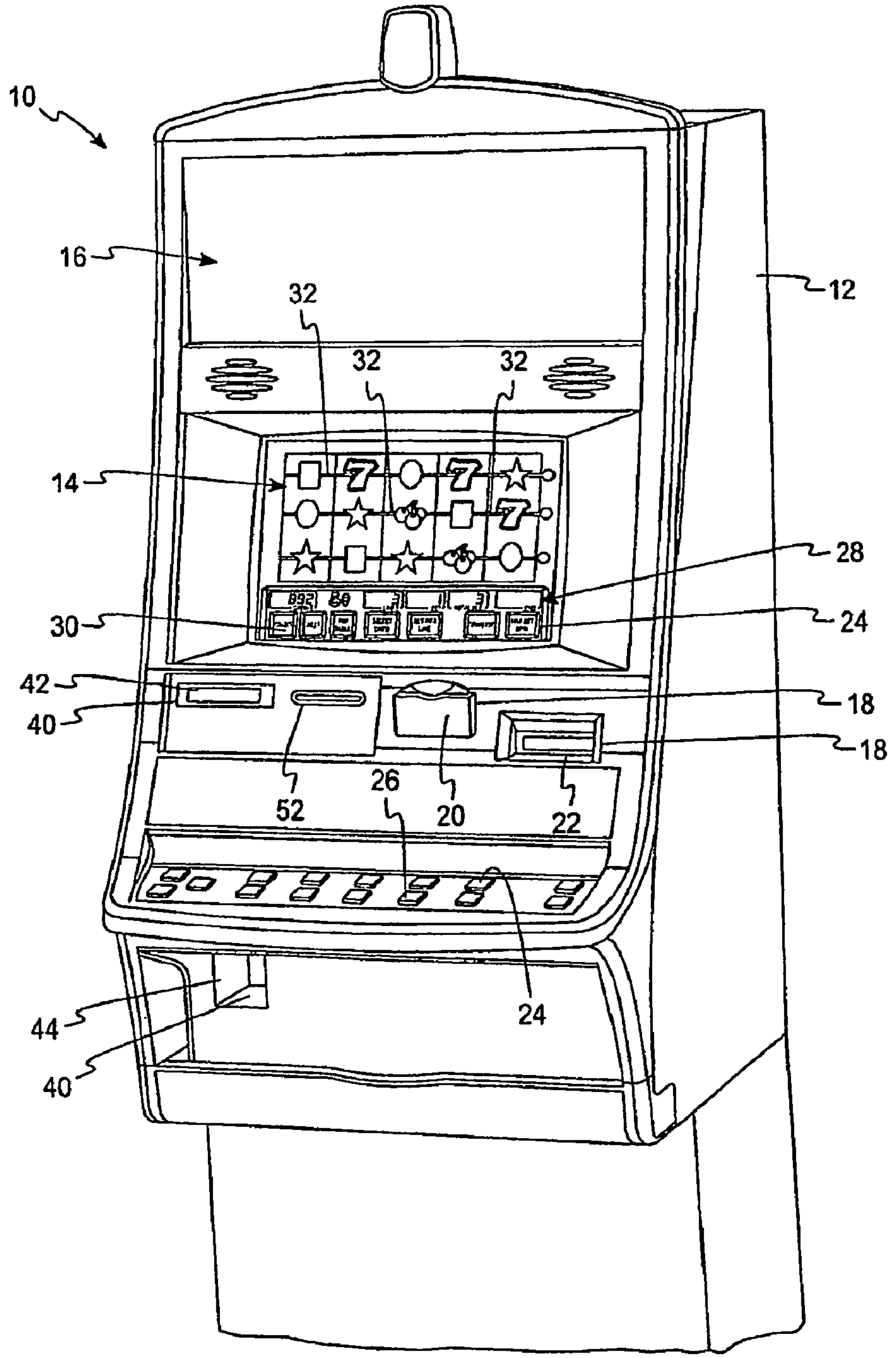
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 similar to the ones used in gaming establishments such as casinos is shown. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus wagering game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic wagering game consists of a plurality of symbols arranged in an array, and includes at least one payline 32 that indicates one or more outcomes of the basic wagering game. Such outcomes are randomly selected in response to the wager by the player. At least one of the plurality of randomly-selected outcomes may be a start-bonus outcome, which can include any variations of symbols or symbol combinations triggering a bonus wagering game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
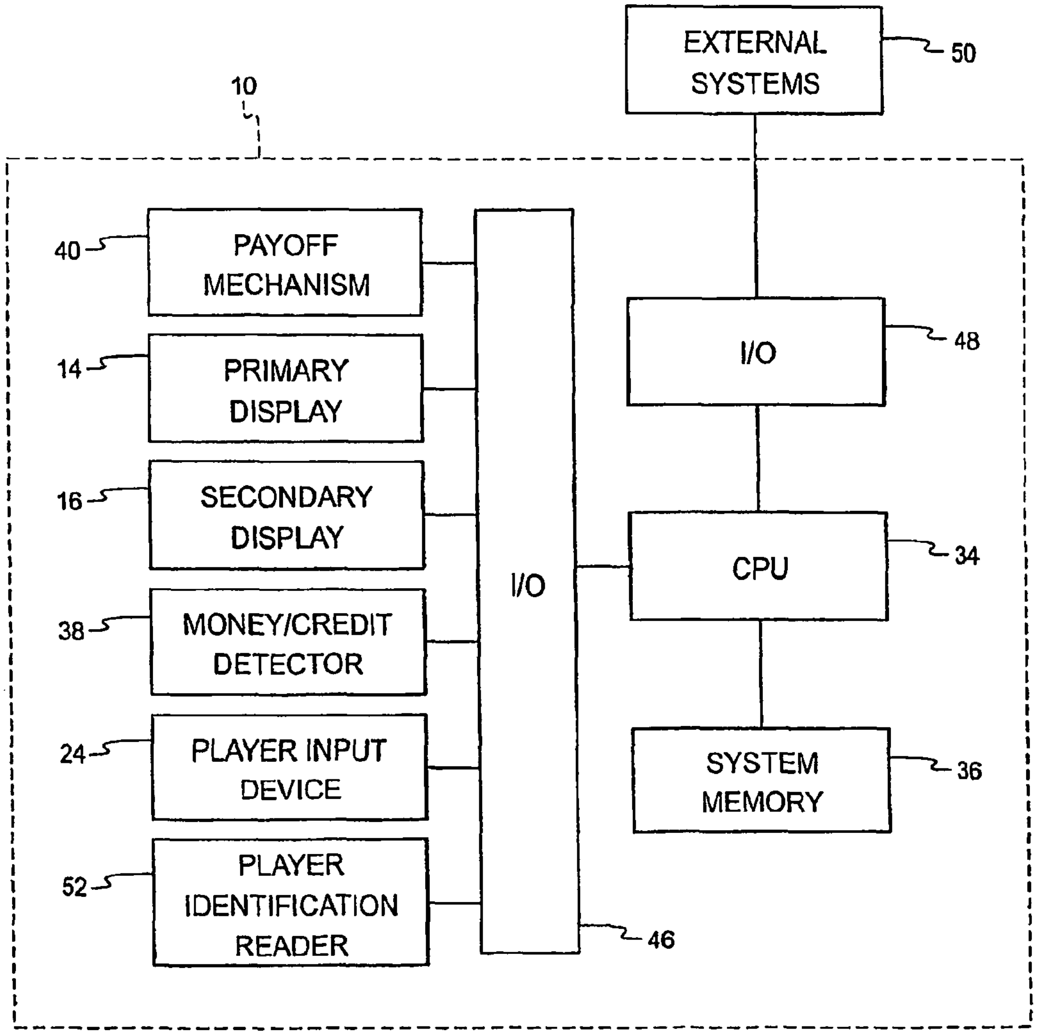
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic wagering game or the bonus wagering game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
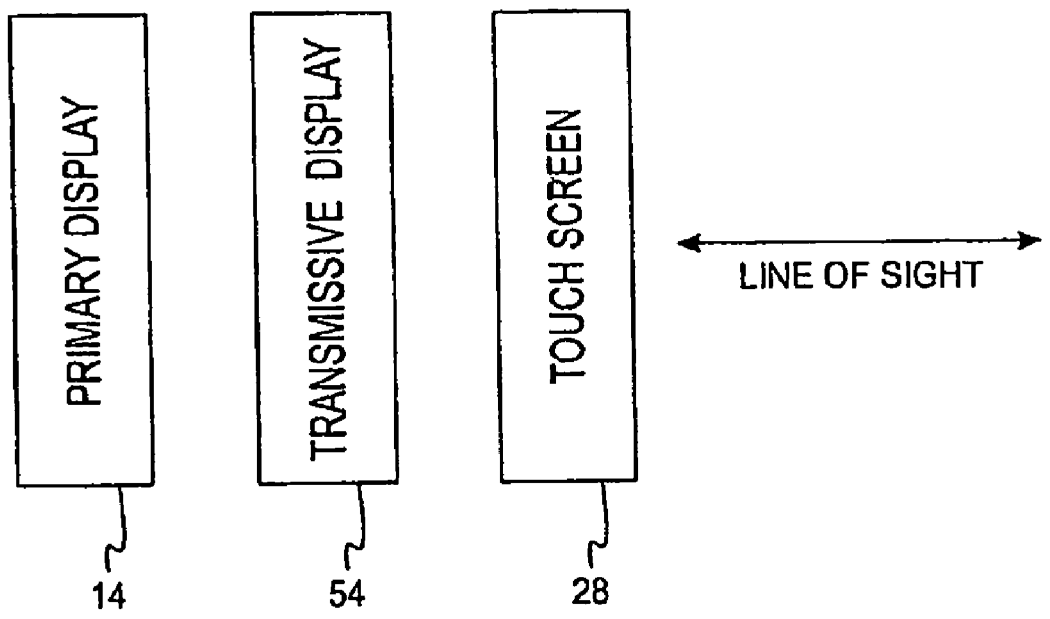
FIG. 3 is block diagram of a transmissive display superimposed on a primary/secondary display of a gaming machine.

FIG. 3 illustrates a block diagram of the gaming machine 10 where a transmissive display 54 has been superimposed on the display 14. The transmissive display 54 may be a transmissive liquid crystal display (LCD) or any other suitable transmissive display and is positioned directly in the player's line of sight as he or she views the display 14. In some embodiments, the touch screen 28 is then mounted over the transmissive display 54 in the player's line of sight. As mentioned above, the transmissive display 54 provides video images that may be selectively made transparent, semi-transparent (i.e., translucent), or opaque in selected places. This allows preselected images on the transmissive display 54 to be displayed over certain portions of the primary display 14, with the result that certain areas of the primary display 14 are either altered in some way (e.g., highlighted, colored, etc.), or completely blocked by the images on the transmissive display 54. All video images on the transmissive display 54 may be rendered in two-dimensional or three-dimensional graphics (e.g., using Flash Macromedia™). The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using the transmissive display 54 in this way allows numerous types of improvements and enhancements to be made to the appearance of the display 14 in real time and during on-going game play.

Thus far, the transmissive display 54 has only been described as being superimposed on the primary display 14. It is also possible, however, to superimpose the transmissive display 54 on the secondary display 16 as well without departing from the scope of the invention. Still, in most embodiments, it is the transmissive display 54 that is superimposed on the primary display 14. The reason is because in gaming machines where the transmissive display 54 is present, most of the time, the primary display 14 is a mechanical display, such as mechanical reels (e.g., for a slot machine), a mechanical wheel (e.g., a roulette game), one or more dice, a pachinko board, or other board game. For examples of the types of mechanical displays that may be used with the transmissive display 54, the reader is again referred to U.S. Published Application No. 20040198485, incorporated previously by reference. In alternative embodiments, however, the primary display 14 may be a video based display such as a CRT or LCD. In further alternative embodiments, the primary display 14 may be a diorama presenting a three-dimensional model of a game environment. The diorama may be stationary in some implementations, or it may slide or move around in one or more dimensions.

Figure 4A:
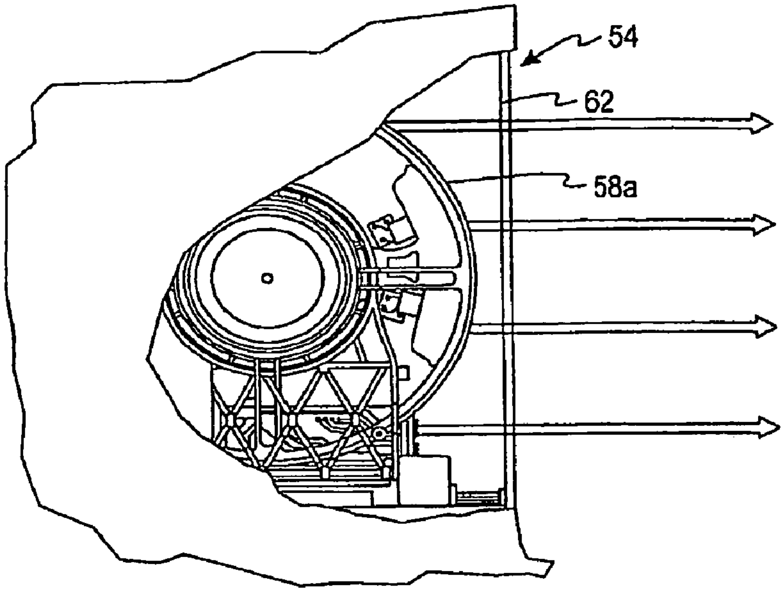
FIGS. 4*a*-4*b* are side views of a transmissive display superimposed on a primary display of a gaming machine.
Figure 4B:
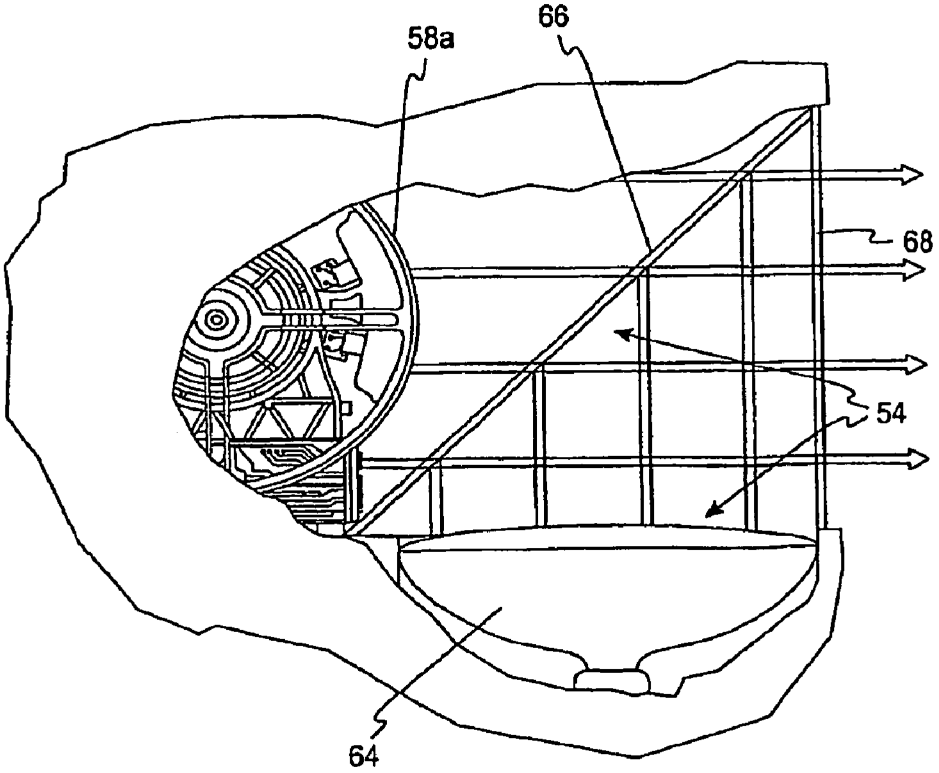

FIGS. 4*a* and 4*b* illustrate exemplary implementations of the transmissive display 54 where the gaming machine 10 employs mechanical reels as the primary display 14. In the examples of FIGS. 4*a* and 4*b*, there are three mechanical reels 58*a*, 58*b*, and 58*c* (only one reel 58*a* is seen here), each of which has a plurality of reel symbols, one shown at 60 (see FIG. 5*b*). At any given time, only three of the reel symbols 60 on each reel 58*a-c* are visible, resulting in a three-by-three array of reel symbols 60 that together represent a randomly selected outcome of the wagering game. The transmissive display 54 is then positioned over the mechanical reels 58*a-c* and may be either a direct image (FIG. 4*a*) or a virtual image (FIG. 4*b*) display.

Where the transmissive display 54 is a direct image display, as in FIG. 4*a*, the direct image may be generated by a flat panel transmissive video display 62 positioned in front of the reels 58*a-c*. Such a flat panel transmissive video display 62 may be, for example, a transmissive liquid crystal display (LCD) commercially available from LG Phillips LCD Co., Ltd., of Seoul, Korea, Sharp Electronics Corp. of Tokyo, Japan, and other display manufacturers. The flat panel transmissive video display 62 is preferably preconfigured with the touch screen 28 (see FIG. 3) mounted to a front surface of the display 62.

Where the transmissive display 54 is a virtual image display, as in FIG. 4*b*, the virtual image may be generated by a projection arrangement, for example, a video display 64 and a partially reflective mirror 66. The partially reflective mirror 66 is positioned at an angle (e.g., 45 degrees) over the mechanical reels 58*a-c* so as to project video images from the video display 64 mounted below the reels 58*a-c* towards the player. The video display 64, which may also be mounted above the mechanical reels 58*a-c*, may be a CRT, LCD, dot matrix, LED, electro-luminescent, or other type of video display known to those having ordinary skill in the art. Video images from the video display 64 are then reflected off the partially reflective mirror 66 so that they appear to the player to be superimposed over the mechanical reels 58*a-c*. In some embodiments, the transmissive display 54 further includes a transparent glass cover/window 68 positioned over the partially reflective mirror 66 that protects the mirror 66 and is optionally configured with the touch screen 28.

Regardless of whether the transmissive display 54 is a direct image display or a virtual image display, in existing gaming machines, the transmissive display 54 is employed primarily to enhance or supplement the basic wagering games that are played on the primary display 14. In the case of the mechanical reels 58*a-c*, the transmissive display 54 is used merely to modify the appearance of the reel symbols 60 in dependence on the outcome of the mechanical reels 58*a-c*. For example, where the outcome increases the value of a particular reel symbol 60, the transmissive display 54 may be used to add "$" signs to that reel symbol 60. Thus, players and casino operators have not heretofore had access to an entirely separate and distinct wagering game on the transmissive display 54 (i.e., a wagering game that may be played without viewing the primary display 14).

In accordance with embodiments of the invention, the gaming machine 10 may be configured to provide a separate and distinct wagering game on the transmissive display 54 in addition to the wagering game on the primary display 14. That is to say, the primary display 14 and the transmissive display 54 each may display their own wagering game independently of the other display 14 or 54 (i.e., without viewing the other display 14 or 54). This endows the gaming machine 10 with three different wagering game options: (a) a wagering game displayed using the primary display 14 only (i.e., without using the transmissive display 54), (b) another wagering game displayed using both the primary display 14 and the transmissive display 54, and (c) yet another wagering game displayed using the transmissive display 54 only (i.e., without using the primary display 14). The result is a single gaming machine 10 with three different wagering game options on a single display area. It is not necessary, however, for the gaming machine 10 to employ all three wagering game options at once. For example, in some embodiments, the gaming machine 10 may be configured to employ only two of the three options, (a) and (b), (b) and (c), or (a) and (c), at any given time.

Of the above options, the wagering games of options (a) and (b) may be generally similar to one another, since they both use the primary display 14. The main difference, if any, typically resides in one or more game enhancement features provided by the transmissive display 54 in option (b). The wagering game of option (c), however, should be separate and distinct from the wagering games of option (a) or (b), since the primary display 14 is not needed for option (c).

Separate and distinct, however, does not necessarily mean that the wagering games are unrelated. In some embodiments, there may be a relationship between the wagering game of the transmissive display 54 (option (c)) and that of the primary display 14 (options (a) and (b)). For example, the wagering game of the primary display 14 may be a basic wagering game and the wagering game of the transmissive display 54 may be a bonus wagering game triggered by the basic wagering game. It is also possible to provide more than one wagering game for each display 14 and 54 such that one or more wagering games may be displayed on the primary display 14 and one or more separate and distinct wagering games may be displayed on the transmissive display 54. In either case, players and casino operators will have the option of choosing among multiple wagering games on the same gaming machine 10.

Other benefits of the invention include the ability to switch out wagering games on the gaming machine 10 without needing to physically modify the gaming machine 10. This ability is useful for business related purposes, for example, when a wagering game shows declining revenue or becomes outdated. Thus, consider the case where the mechanical reel slot machine game of the primary display 14 is determined to be no longer profitable. In accordance with embodiments of the invention, rather than replace the entire gaming machine 10, the casino operator may simply block out the mechanical reels 58*a-c* by making the transmissive display 54 opaque. A different wagering game may then be downloaded (if not already present) to the gaming machine 10 and displayed on the transmissive display 54. Likewise, if the wagering game on the transmissive display 54 is performing poorly, the casino operator may make the transmissive display 54 transparent (or translucent) so that only the primary display 14 is visible. In the latter situation, the transmissive display 54 may still be used to enhance or supplement the wagering game displayed on the primary display 14 (as mentioned above). Exemplary implementations of the foregoing embodiments are described below with respect to FIGS. 5*a*-5*c*.

Figure 5A:
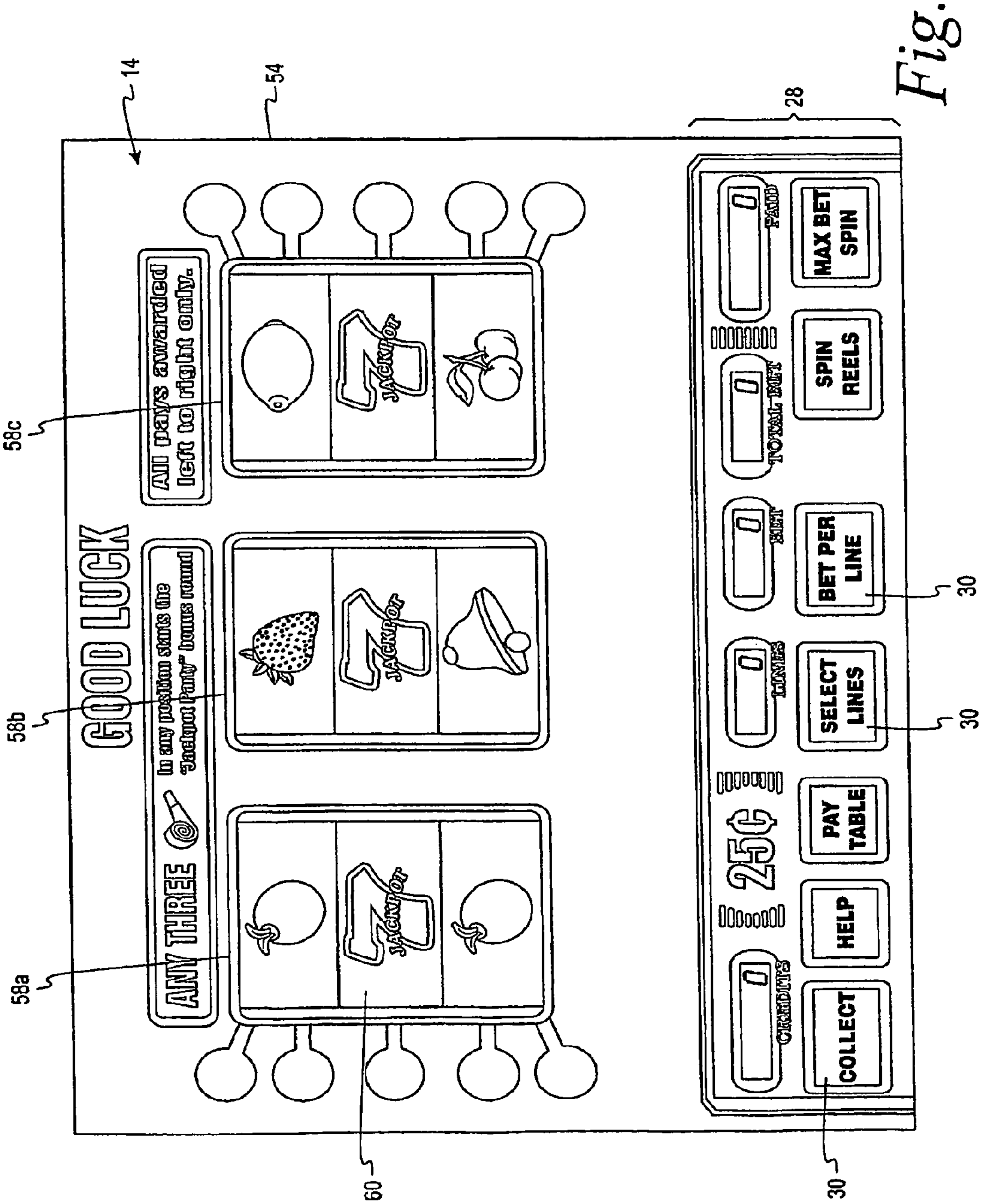
FIGS. 5*a*-5*c* illustrate examples of wagering games that may be displayed on the transmissive display and the primary display, respectively, of the gaming machine of FIGS. 4*a*-4*b*.

In FIG. 5*a*, the primary display 14 alone is used to display a wagering game (option (a) above). As can be seen, the transmissive display 54 here has been made substantially transparent (or translucent) so that only the mechanical reels 58*a-c* of primary display 14 are visible. The wagering games that are available in this embodiment are therefore mechanical reel games, although other mechanical wagering games (e.g., cards, wheels, dice, roulette, etc.) may also be available depending on the type of primary display 14. Also seen here are the soft touch keys 30 of the touch screen 28 as well as various signage for providing information, instructions, and/or encouragement to the players.

Figure 5B:
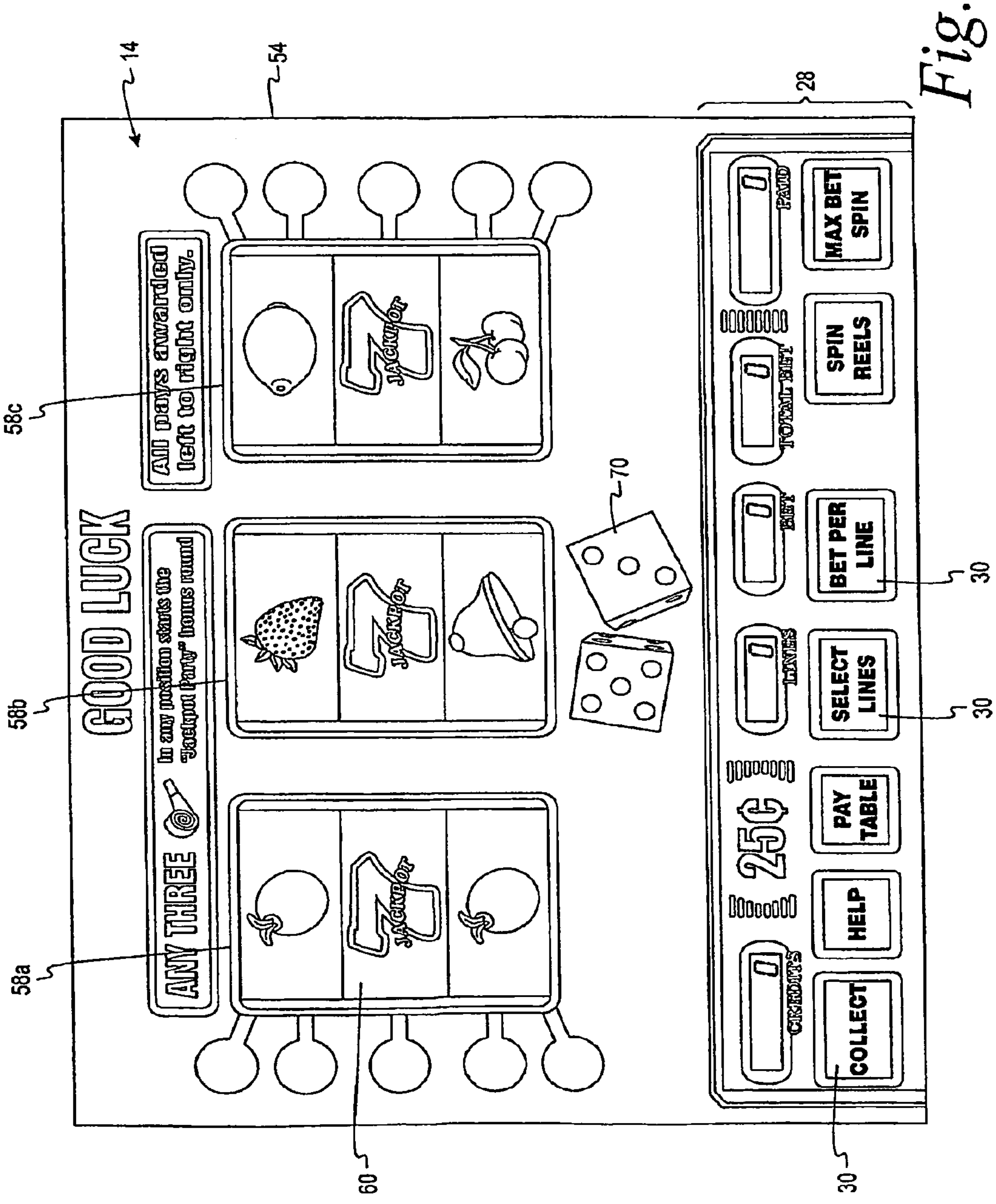

FIG. 5*b* illustrates an exemplary implementation of option (b) in which both the primary display 14 and the transmissive display 54 are used to display a wagering game. Here, the transmissive display 54 serves merely to enhance or supplement the wagering game displayed on the primary display 14. The enhancement in this example is a rolling dice feature 70 superimposed over a certain portion of the mechanical reels 58*a-c*. The rolling dice feature 70 acts as a random multiplier to increase any credit awards resulting from the outcome of the wagering game on the primary display 14.

Figure 5C:
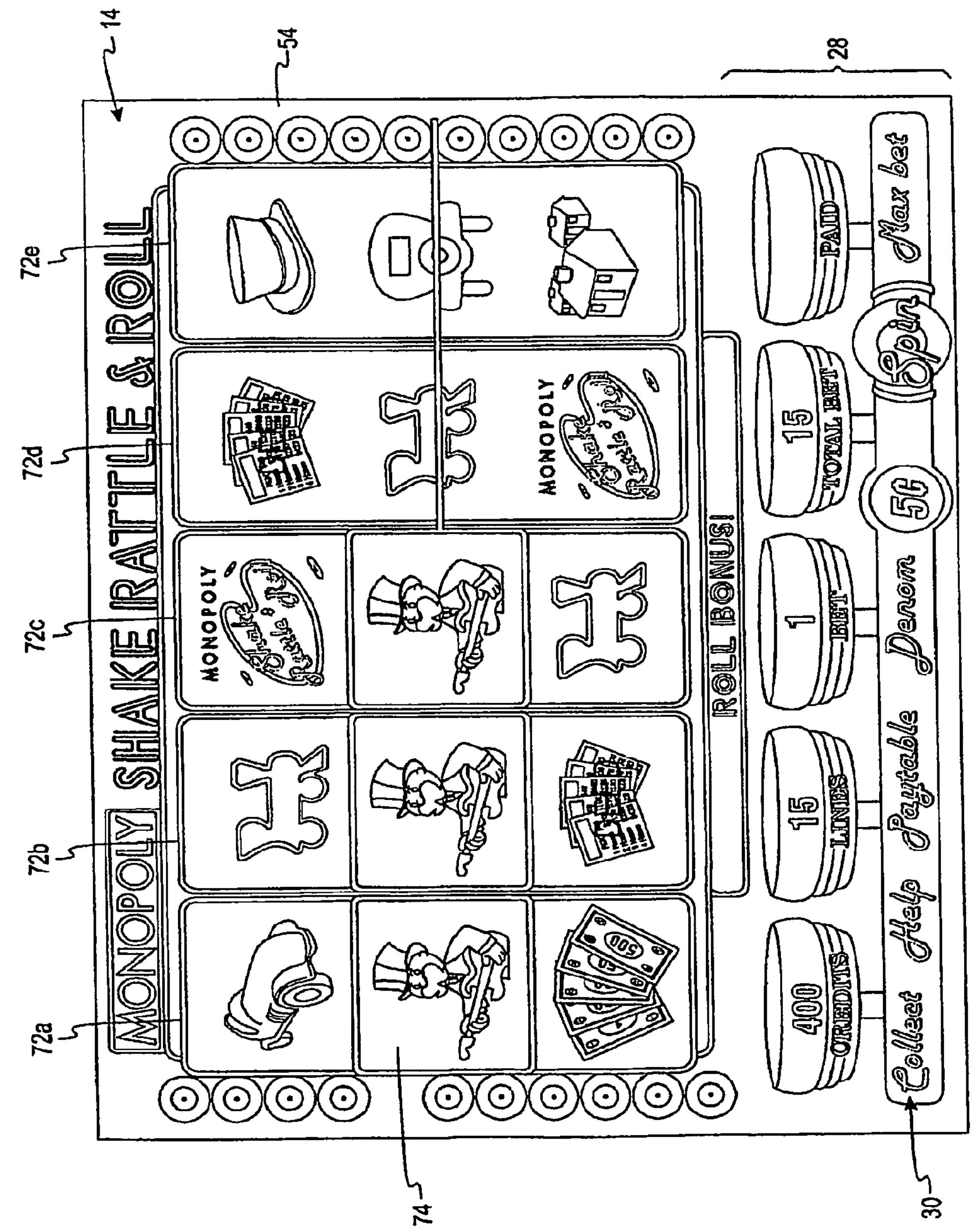

FIG. 5*c* illustrates an exemplary implementation of option (c) in which the transmissive display 54 alone is used to display a wagering game. The transmissive display 54 here has been made substantially opaque so that the primary display 14 is blocked out (denoted by the dotted arrow), leaving only the transmissive display 54 (and the wagering game displayed thereon). As it turns out, the wagering game displayed on the transmissive display 54 in this example is also a slot machine game. The slot machine game here, however, has five video reels 72*a-e* instead of three mechanical reels 58*a-c*. Also, the reels 72*a-e* have reel symbols 74 that reflect a different game theme than the reel symbols 60 of the mechanical reels 58*a-c*. In any event, those of ordinary skill in the art understand that other types of wagering game (e.g., poker, blackjack, dice, roulette, etc.) may be used without departing from the scope of the invention.

In one embodiment, the wagering game of the transmissive display 54 and that of the primary display 14 are entirely unrelated to each other (i.e., the outcome of one wagering game has no effect on the outcome of the other, and vice versa). However, as mentioned above, it is also possible for the two wagering games to be related in some way. For example, the wagering game of the primary display 14 may be a basic game and the wagering game of the transmissive display 54 may be a special event game that is triggered by an outcome of the basic game. Such a special event game may include, for example, a bonus game, a progressive game, and other types of special event games.

In some embodiments, there may be several different special event games, including several different bonus games and several different progressive games, and/or there may be several different levels of the same bonus game and progressive game. These special event games may share the same "expected value" (EV), or they may each have their own EV. The particular game or level of game displayed may depend on one or more factors, such a player's accumulated wagers, his/her membership in a casino players club, and so forth.

The special event games, or portions thereof, may be stored locally on the gaming machine 10, or they may be downloaded from the gaming network and updated from time to time. In some embodiments, the basic game, including any mechanical game content, may also be downloaded from the gaming network and updated from time to time. These downloads/updates may occur via a wired or wireless connection and may take place on an "as needed" basis, a regular schedule, or an irregular schedule. The scheduled downloads/updates may occur in the background undetected by the player, or they may be released as one or more special events that are widely promoted within and/or outside the casino, for example, as a special rollout, premiere, or an opening-night event. In the latter case, an appropriate celebration may be hosted by the casino to mark the occasion, with a daily or hourly countdown mechanism, possibly displayed on the gaming machine 10, to count down the time until the downloads/updates are released.

In some embodiments, at the end of the wagering game session (i.e., when the player gets ready to depart the gaming machine), the current state of the special event games may be retained until the player's next wagering game session. Such retention may be achieved using, for example, a ticket-in-ticket-out (TITO) or account card system well known to those of ordinary skill in the art. Gaming systems that are capable of such retention are generally referred to as "persistent state" gaming systems because they are able to store the current state of the wagering game for a player when that player concludes a gaming session and then restore the current state of the wagering game for that player when the player begins a new gaming session at the same or a different gaming machine.

While the invention has been described with respect to a number of specific embodiments, those skilled in the art will recognize that the innovative concepts described herein can be modified and varied over a wide range of applications. For example, although the special event games have been described as being displayed on the transmissive display, it is equally possible to display the special event games on the primary display. Accordingly, each of these embodiments and obvious variations thereof is contemplated as falling within the spirit and scope of the claimed invention, which is set forth in the following claims.

What is claimed is:

1. A gaming system configured to conduct gaming operations while modifying a wagering game by updating, downloading, and replacing game content, the system comprising:

a gaming machine including a mechanical display device and a transmissive display device, the mechanical display device being operable to display first game images during play of a first wagering game, the transmissive display device being operable to display second game images during play of a second wagering game displayed in front of and independently of the first wagering game, the transmissive display device being positioned in a player's line of sight between the player and the mechanical display device, the transmissive display device being distinct and spatially separated from the mechanical display device, the transmissive display device being further operable to display at least one overlying third game image during play of a third wagering game, wherein the at least one overlying third game image enhances one or more underlying third game images displayed by the mechanical display device during play of the third wagering game;

one or more processors;

one or more game content memory storage locations;

at least one memory device storing executable instructions that, when executed by the one or more processors, cause the one or more processors to operate with the mechanical and transmissive display devices to:

disable a selected one or two of the first, second, and third wagering games;

while the selected one or two games are disabled, conduct one or two still-enabled, unselected wagering games by displaying one or two of the first, second, and third game images on the corresponding display devices;

receive, from the one or more game content memory storage locations, game content for modifying the selected one or two games;

modify the selected one or two games in accordance with the received game content; and after modifying the selected one or two games, enable the selected one or two games for play on one or both of the display devices of the gaming machine.

2. The gaming system of claim 1, wherein the first wagering game is displayed using the mechanical display device only, the second wagering game is displayed using the transmissive display device only, and the third wagering game is displayed on both the mechanical and transmissive display devices.

3. The gaming system of claim 1, wherein the at least one overlying third game image superimposes at least one game enhancement on the one or more underlying third game images during play of the third wagering game.

4. The gaming system of claim 1, wherein the third wagering game comprises a base game and a bonus game.

5. The gaming system of claim 1, wherein the game content comprises one or two different games that replace the selected one or two games.

6. The gaming system of claim 1, wherein the game content comprises updates for the selected one or two games.

7. The gaming system of claim 1, wherein the one or more processors and the at least one memory device reside in the gaming machine.

8. The gaming system of claim 1, wherein the one or more game content memory locations reside on a game server on a communications network, and wherein the game content is received via downloading from the game server.

9. The gaming system of claim 8, wherein the downloading occurs according to one or more of the following: as needed, a regular schedule, and an irregular schedule.

10. The gaming system of claim 1, wherein the one or more game content memory locations reside in local memory of the gaming machine.

11. The gaming system of claim 1, wherein the one or more game content memory locations reside in the at least one memory device.

12. The gaming system of claim 11, wherein the at least one memory device resides on a game server on a communications network.

13. A computer-implemented method of modifying a wagering game on a gaming machine including a mechanical display device and a transmissive display device while providing concurrent gaming operations, the method comprising:

receiving game content, from one or more game content memory storage locations, for modifying one or two of a first, second, and third wagering game, the first wagering game being displayed as first game images on the mechanical display device, the second wagering game being displayed, in front of and independently of the first wagering game, as second game images on the transmissive display device, wherein the transmissive display device is positioned in a player's line of sight between the player and the mechanical display device and is distinct and spatially separated from the mechanical display device, the third wagering game being displayed as at least one overlying third game image on the transmissive display device and as one or more underlying third game images on the mechanical display device, wherein the at least one overlying third game image enhances the one or more underlying third game images during play of the third wagering game;

disabling, via one or more processors, a selected one or two of the first, second, and third wagering games;

while the selected one or two games are disabled, conducting, via the one or more processors, one or two still-enabled, unselected games by displaying one or two of the first, second and third game images on the corresponding display devices of the gaming machine;

modify, via the one or more processors, the selected one or two games in accordance with the received game content; and after modifying the selected one or two games, enable, via the one or more processors, the selected one or two games for play on one or both of the display devices.

14. The method of claim 13, wherein the first wagering game is displayed using the mechanical display device only, the second wagering game is displayed using the transmissive display device only, and the third wagering game is displayed on both the mechanical and transmissive display devices.

15. The method of claim 13, wherein the at least one overlying third game image superimposes at least one game enhancement on the one or more underlying third game images during play of the third wagering game.

16. The method of claim 13, wherein the third wagering game comprises a base game and a bonus game.

17. The method of claim 13, wherein the game content comprises one or two different games that replace the selected one or two games.

18. The method of claim 13, wherein the game content comprises updates for the selected one or two games.

19. The method of claim 13, wherein the one or more game content memory storage locations reside on a game server on a communications network, and wherein the game content is received via downloading from the game server.

20. The gaming system of claim 13, wherein the one or more game content memory locations reside in the local memory of the gaming machine.

21. A computer-readable, non-transitory medium storing instructions that, when executed by a gaming system including a gaming machine with a mechanical display device and a transmissive display device, cause the gaming system to perform a method comprising:

receiving game content, from one or more game content memory storage locations, for modifying one or two of a first, second, and third wagering game, the first wagering game being displayed as first game images on the mechanical display device, the second wagering game being displayed, in front of and independently of the first wagering game, as second game images on the transmissive display device, wherein the transmissive display device is positioned in a player's line of sight between the player and the mechanical display device and is distinct and spatially separated from the mechanical display device, the third wagering game being displayed as at least one overlying third game image on the transmissive display device and as one or more underlying third game images on the mechanical display device, wherein the at least one overlying third game image enhances the one or more underlying third game images during play of the third wagering game;

disabling, via one or more processors, a selected one or two of the first, second, and third wagering games;

while the selected one or two games are disabled, conducting, via the one or more processors, one or two still-enabled, unselected games by displaying one or two of the first, second and third game images on the corresponding display devices of the gaming machine;

modify, via the one or more processors, the selected one or two games in accordance with the received game content; and after modifying the selected one or two games, enable, via the one or more processors, the selected one or two games for play on one or both of the display devices.

22. The gaming system of claim 21, wherein the first wagering game is displayed using the mechanical display device only, the second wagering game is displayed using the transmissive display device only, and the third wagering game is displayed on both the mechanical and transmissive display devices.

23. The computer-readable medium of claim 21, wherein the one or more game content memory locations reside in a game server on a communications network.

24. The computer-readable medium of claim 23, wherein the medium resides on the game server.

25. The computer-readable medium of claim 21, wherein disabling the selected one or two games comprises blocking out the mechanical display device by making the transmissive display device opaque.

* * * * *